(12) United States Patent
Mickler et al.

(10) Patent No.: US 9,095,884 B2
(45) Date of Patent: Aug. 4, 2015

(54) APPARATUS AND METHOD FOR REMOVING AND RECOVERING OIL FROM SOLIDS

(76) Inventors: Joe D. Mickler, Mountain View, AR (US); Lance Stanfill, Houston, TX (US)

(*) Notice: Subject to any disclaimer, the term of this patent is extended or adjusted under 35 U.S.C. 154(b) by 855 days.

(21) Appl. No.: 13/354,171

(22) Filed: Jan. 19, 2012

(65) Prior Publication Data
US 2012/0187028 A1     Jul. 26, 2012

Related U.S. Application Data

(60) Provisional application No. 61/435,193, filed on Jan. 21, 2011.

(51) Int. Cl.
| | |
|---|---|
| *B01D 11/02* | (2006.01) |
| *B09C 1/00* | (2006.01) |
| *B09B 3/00* | (2006.01) |
| *B09C 1/02* | (2006.01) |
| *B09C 1/06* | (2006.01) |
| *E21B 21/06* | (2006.01) |
| *B01D 11/00* | (2006.01) |
| *B01D 12/00* | (2006.01) |
| *C10G 1/04* | (2006.01) |

(52) U.S. Cl.
CPC ... *B09C 1/00* (2013.01); *B09B 3/00* (2013.01); *B09C 1/02* (2013.01); *B09C 1/06* (2013.01); *C10G 1/045* (2013.01); *E21B 21/066* (2013.01); *C10G 2300/201* (2013.01); *C10G 2300/44* (2013.01)

(58) Field of Classification Search
CPC .... B01D 11/00; B01D 11/02; B01D 11/0261; B01D 2011/002; B01D 12/00; C10G 1/04; C10G 1/045; C10G 1/047
See application file for complete search history.

(56) References Cited

U.S. PATENT DOCUMENTS

| | | | |
|---|---|---|---|
| 2,873,032 A | | 2/1959 | Henry |
| 5,690,811 A | * | 11/1997 | Davis et al. .............. 208/428 |

FOREIGN PATENT DOCUMENTS

| | | | | |
|---|---|---|---|---|
| CN | 101812979 A | | 8/2010 | |
| GB | 1399938 | * | 7/1975 | ............... B03B 9/00 |
| NO | 923349 A | | 8/1992 | |
| WO | 8909091 A1 | | 10/1989 | |

OTHER PUBLICATIONS

International Search Report and Written Opinion; From International Application PCT/US2012/021986; Dated Oct. 5, 2012.

* cited by examiner

*Primary Examiner* — Brian McCaig
(74) *Attorney, Agent, or Firm* — Patterson & Sheridan, LLP

(57) ABSTRACT

A method and apparatus for removing and recovering oil from wellbore cuttings is provided. Oil-contaminated solids are transported through two or more solvent baths on vibrating conveyors and contacted with solvent flowing countercurrent to the direction of transport of the oil-contaminated solids through the baths such that oil contaminant is separated from the solids.

11 Claims, 4 Drawing Sheets

APPARATUS AND METHOD FOR REMOVING AND RECOVERING OIL FROM SOLIDS

CROSS-REFERENCE TO RELATED APPLICATIONS

This application claims benefit of U.S. provisional patent application Ser. No. 61/435,193, filed Jan. 21, 2011, which is herein incorporated by reference.

BACKGROUND OF THE INVENTION

1. Field of the Invention

Embodiments described herein generally relate to apparatus and method for removing and recovering oil from solids, such as wellbore cuttings.

2. Description of the Related Art

In the drilling of oil and gas wells, drilling fluids or "muds" are used to provide wellbore lubrication, to cool the drill bit, to protect against corrosion, to provide a pressure head to maintain formation integrity, and to remove wellbore cuttings. One type of drilling mud used is oil-based. Oil-based drilling muds are employed in operations where it is desirable to drill at elevated temperatures, improve bore hole stability, control shale sloughing, and control water wetting of the formation such as in clay and some shale formations. Oil-based drilling muds are also desirable in "sour gas" wells and inhibit corrosion and provide superior lubrication of the drill pipe in the wellbore.

A typical oil-based drilling mud includes a diesel, synthetic or mineral oil base, oil soluble emulsifiers, water (often salt water), oil wetting agents such as calcium sulfonates and organic amines to provide for oil wetting of the solids, and additives to control leak-off into the formation.

Drilling muds are typically circulated down the inside of a tubular drill string, outwardly through the drill bit and up the annulus between the drill string and the bore. Drilling muds serve to carry the wellbore cuttings away from the bit and out of the bore hole. These cuttings contain varying amounts of oil retained on the cuttings as a result of the oil used in the manufacture of oil-based drilling muds. Typically, cuttings extracted from the bore hole first go across a shaker, e.g., a shale shaker, to separate the mud from the cuttings. When the oil saturated cuttings are separated from the oil-based drilling muds with the shaker, the cuttings extracted from the fluid phase of the oil-based muds are particulate solids retaining a high percentage of oil (e.g., 18% by weight) on the surface of the solids.

The separated cuttings include all solids that are separated from the oil-based drilling mud circulated through a wellbore during normal drilling operations. Most of the solids comprise the actual wellbore material produced when drilling the formation. Additional solids that may be recovered are materials which are added to the oil-based drilling mud to enhance or maintain the oil-based drilling fluid parameters. Some of these include weighting materials (such as barite, calcium carbonate, etc.), lost circulation materials (such as various fibrous plugging agents), and various chemicals used to maintain the drilling fluid's properties. These additions will result in cutting sizes varying from wellbore cuttings (20 to 100 microns) to weighting materials (e.g., barite) which is finely ground (about <20 microns). Therefore, the wellbore cuttings extracted from the formation will consist of particulate solids having a wide range of sizes which vary from extremely fine reground material to a coarser or larger oil-based cutting.

Wellbore cuttings adhere to the oil, trapping large quantities of oil-based mud in their intergranular spaces and creating environmental concerns regarding disposal of the contaminated wellbore cuttings. For example, uncleaned wellbore cuttings which are dumped can cause substantial pollution as the oil is gradually released from surface adhesion to the wellbore cuttings. Because the industry and the U.S. government want to avoid any such oil pollution, regulations governing the disposal of wellbore cuttings or solids have been promulgated.

In the past, contaminated wellbore cuttings were transported to appropriate disposal sites. Such storage and transportation operations are costly and environmentally undesirable. Typically, oil-contaminated cuttings contain about fifty percent (50%) by volume of oil-based liquid. Because the value of this large volume of entrained oily liquids is considerable, there is a strong economic incentive to recover the entrained oil both for economic as well as environmental reasons. Therefore, there is a need for an apparatus and method of removing and recovering oil from wellbore cuttings which achieves a high oil recovery.

SUMMARY OF THE INVENTION

Disclosures contained herein relate to apparatus and methods that recycle the oil contained on oil-soaked cuttings removed from a wellbore. The methods use a countercurrent flow of cleaning solvent to dissolve and separate the oil from the surfaces and pores of the cuttings while moving along a vibrating conveying surface.

Embodiments described herein generally relate to apparatus and methods of removing and recovering oil from cuttings. In one embodiment, a method for separating solvent-soluble contaminant from wellbore cuttings after initial separation of cuttings from drilling mud is provided. The method comprises the steps of moving and agitating contaminated wellbore cuttings on a first vibrating conveyor in a first direction, flowing solvent through the first vibrating conveyor in a second direction countercurrent to the first direction, moving and agitating contaminated wellbore cuttings on a second vibrating conveyor in a third direction, and flowing solvent through the second vibrating conveyor in a fourth direction countercurrent to the third direction. In one embodiment, the solvent is hexane. In another embodiment the solvent flows through the first and second vibrating conveyors in parallel. In yet another embodiment, the solvent flows through the first and second vibrating conveyors in series.

In another embodiment, an apparatus for cleaning solids contaminated with solvent-soluble contaminant is provided. The apparatus comprises a bath system having at least a first vibrating conveyor and a second vibrating conveyor connected in series, and solvent flow system providing countercurrent flow of solvent through the first and second vibrating conveyors with respect to the solids. The apparatus may further comprise a solvent rinse for the solids and a dryer for the solids. The solvent flow system may be connected to the first and second vibrating conveyors in series. In an alternative embodiment, the solvent flow system may be connected to the first and second vibrating conveyors in parallel.

In another embodiment, an assembly for separating solvent-soluble contaminant from wellbore cuttings is provided. The assembly comprises a first vibrating conveyor connected to a second vibrating conveyor in series. The first and second vibrating conveyors are configured to agitate and move contaminated wellbore cuttings in a first direction. The assembly further comprises a solvent flow system providing flow of solvent through the vibrating conveyors in a second opposite direction for separating at least part of the solvent-soluble contaminant from the wellbore cuttings. Additionally, the assembly comprises a drying device configured to dry the wellbore cuttings received from the second vibrating conveyor. The solvent flow system may be connected to the vibrating conveyors in series.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

It is contemplated that elements disclosed in one embodiment may be beneficially utilized in other embodiments without specific recitation.

DETAILED DESCRIPTION

Embodiments described herein provide apparatus and methods of removing and recovering oil from wellbore cuttings. Although discussed in relation to oil-based wellbore cuttings, this process may be applied in cleaning and extracting contaminants from other solids as well, such as oil sands.

Typically, the wellbore cuttings circulated through the mud system have oil-based drilling mud trapped within the intergranular spaces or voids of the cuttings. The method and apparatus disclosed herein are provided for removing the oil-based contaminants from the intergranular spaces of the cuttings.

Figure 1:
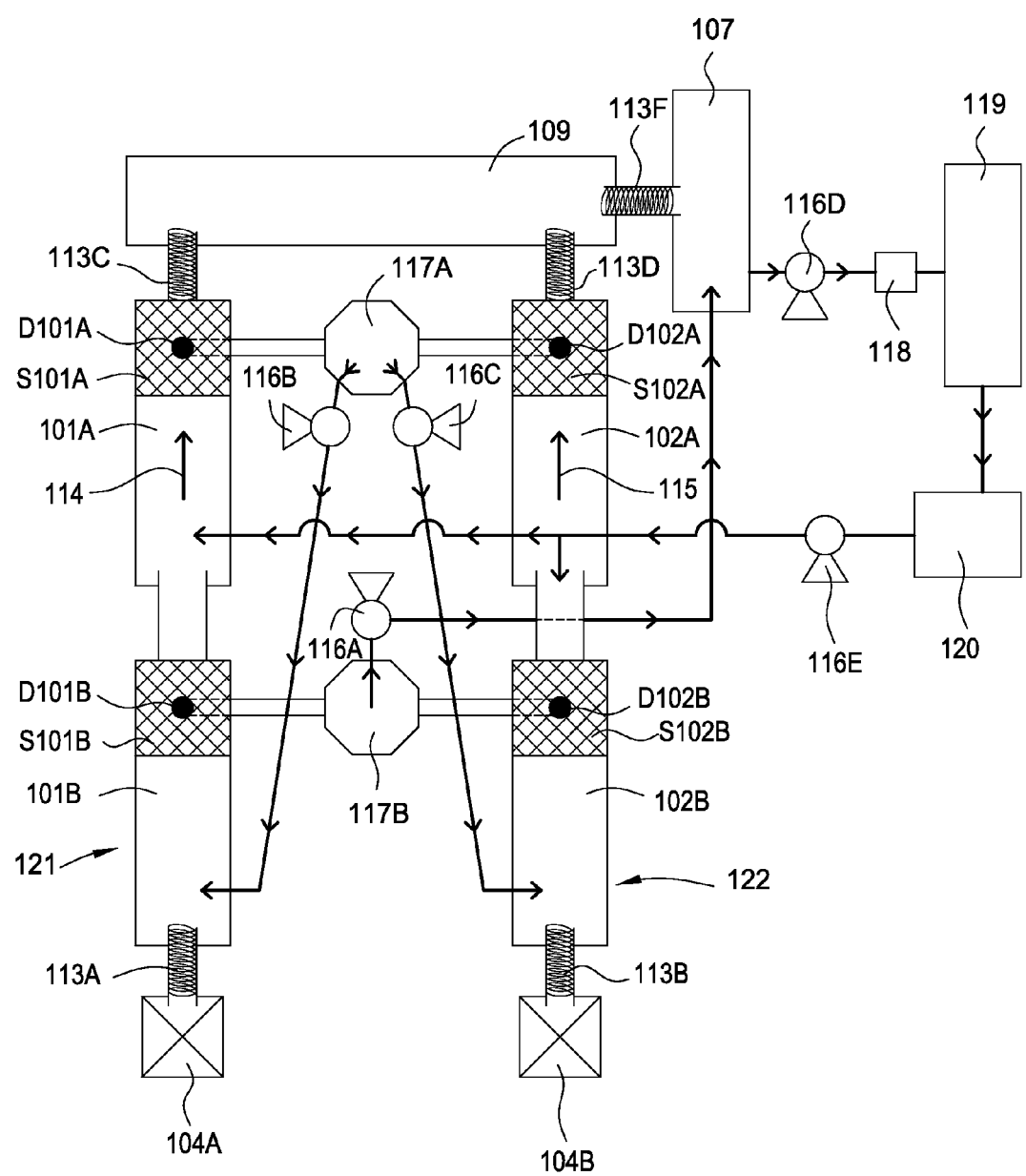
FIG. 1 is a schematic view of a two-stage apparatus for recovering oil from wellbore cuttings having a solvent flow system.

FIG. 1 is a schematic view of a two-stage apparatus 100 for recovering oil from wellbore cuttings having a solvent flow system connected to a two-stage vibrating conveyor in series. The apparatus 100 shown in FIG. 1 includes a first solvent bath line 121 and a second solvent bath line 122 connected in parallel, wherein each line 121, 122 comprises two solvent baths connected in series. More specifically, the first solvent bath line 121 includes solvent bath 101B (stage 1) in series with solvent bath 101A (stage 2), and the second solvent bath line 122 includes solvent bath 102B (stage 1) in series with solvent bath 102A (stage 2).

Each solvent bath 101A, 101B, 102A, and 102B is a vibrating conveyor with a removable screen (S101A, S101B, S102A, and S102B) and a drain (D101A, D101B, D102A, and D102B). The apparatus 100 further includes pumps 116A, 116B, 116C, 116D, and 116E that pump solvent through the apparatus 100. During the wash cycle, circulating tanks 117A, 117B are filled by drains D101A, D101B, D102A, and D102B, which catch the solvent that passes through the screens. These pumps, drains and circulating tanks keep the solvent flowing in series in a direction countercurrent to the direction of movement of the oil-contaminated cuttings. While FIG. 1 shows the apparatus 100 comprising two lines of solvent baths 121, 122 with screens, each line in parallel, other embodiments may comprise just one line, or more than two lines of solvent baths.

Hoppers 104A and 104B in the lines 121, 122, respectively, may contain oil-contaminated wellbore cuttings that have been previously separated from the drilling mud using, for example, a shale shaker or other separator that makes an initial separation of the drilling mud and the cutting from the fluid extracted from the wellbore. Augers 113A and 113B may be used to feed a consistent flow at a specified flow rate of the oil-contaminated drill cuttings from hoppers 104A and 104B, respectively, into solvent baths 101B, and 102B, respectively. Solvent baths 101B and 102B may contain a solvent/oil mixture as described below.

The solvent in solvent baths 101A and 102A comes from a fresh solvent tank 120, which is introduced upstream (with respect to solvent flow). The solvent in the apparatus of this invention may be a low boiling point organic compound that is substantially miscible with oil and substantially immiscible with water. The solvent may be selected from the group consisting of hexane, trichloro-trifluoroethane, methylene chloride, trichloro-trifluoroethane/methylene chloride azeotrope, ethylene dichloride, perchloroethylene, chloroform, methylchloroform and carbon tetrachloride. Other solvents known in the industry may also be used in this apparatus and process, so long as it dissolves enough oil entrained in the cuttings to provide drill cuttings which are sufficiently free of oily contamination for environmentally acceptable disposal. Hexane is commonly used for environmental reasons.

According to one method, the oil-contaminated wellbore cuttings from hopper 104A and 104B may be introduced into solvent baths 101B and 102B containing a solvent (which contains some amount of oil) for a first stage wash. The solvent is pumped into solvent baths 101B and 102B from circulating tank 117A, by pumps 116B and 116C, respectively. As shown in FIG. 1, circulating tank 117A is attached to drains D101A, D102A of solvent baths 101A and 102A, and thus the solvent pumped into solvent baths 101B and 102B is from solvent baths 101A and 102A. In one embodiment, a constant volume of solvent is maintained in each solvent bath. The level of solvent covering the contaminated cuttings in solvent baths 101B and 102B can be adjusted by controlling the volume of fluid pumped from circulating tank 117A and through pumps 116B and 116C, respectively, with the overflow passing through the removable screens S101B and S102B and into drains D101B, D102B, which feed into circulating tank 117B. The solvent pumped from solvent bath 101A into solvent bath 101B will contain a contaminated solvent and dissolved oil slurry from solvent bath 101A. Similarly, the solvent pumped from solvent bath 102A into solvent bath 102B will contain a contaminated solvent and dissolved oil slurry from solvent bath 102A.

Solvent baths 101B and 102B comprise a vibrating conveying surface which may be set at a vibration frequency so that the oil-contaminated drill cuttings are agitated as they move in a direction opposite to the flow of solvent. The general direction of movement of the oil-contaminated cuttings through solvent baths 101A, 101B, 102A and 102B is shown in FIG. 1 by arrows 114 and 115, respectively. The cuttings can move uphill, downhill, or on a level surface, as desired, to reduce agglomeration. Uphill movement is typically used to maintain separation of solvent baths.

Each solvent bath (101A, 101B, 102A, and 102B) is a vibrating conveyor with removable screen (S101A, S101B, S102A, and S102B). In one embodiment, the vibrating conveyor may be attached to a vibrator or oscillating mechanism.

The vibrating conveyor may include a solid conveying surface that is formed in the shape of a trough and an opening in the floor of the trough constructed to attach a removable screen with a drainage system under the screen opening. Typically, the sides of the trough may be sealed to ensure that the solvent remains in the vibrating conveyor. The vibrating conveyor may further include a cover disposed on the trough. The cover is used to contain the oil-contaminated wellbore cuttings within the vibrating conveyor as the oil-contaminated wellbore cuttings are agitated and move through the baths and across the screens.

For ease of description, flow along solvent baths 101A, 101B, and solvent screens S101A and S101B, will be described. However, a similar process would occur in the parallel line of solvent baths 102A, 102B, and solvent screens S102A and S102B. As the oil-contaminated cuttings move through vibration along solvent bath 101B, the solvent slurry generally flows in an opposite direction. The agitation of the oil-contaminated cuttings by the vibrating conveyors, along with the countercurrent flow of solvent, facilitates removal of entrained oils from the cuttings. The contaminated solvent and dissolved oil slurry may be introduced at the same end of solvent bath 101B at which the oil-contaminated cuttings are introduced by auger 113A. Pump 116B pumps the contaminated solvent and dissolved oil slurry from circulating tank 117A which was collected as excess solvent that passed through screen S101A into drain D101A of solvent bath 101A.

Once the solvent/oil slurry travels through solvent bath 101B, it passes through screen S101B into drain D101B and into circulating tank 117B. The oil/solvent slurry is pumped through pump 116A into centrifuge 107. This helps control the level of solvent/oil slurry in solvent bath 101B. Once the partly cleaned oil-contaminated cuttings reach the end of solvent bath 101B, they are transported through solvent bath 101A using a similar vibrating conveying surface as in solvent bath 101B. Solvent bath 101A will contain a solvent/oil slurry which is less contaminated than that the solvent/oil slurry in solvent bath 101B.

A similar process occurs in solvent bath 101A, wherein the oil-contaminated cuttings move in a direction towards cuttings heating device 109 while oil in the cuttings is dissolved in the solvent/oil slurry. Fresh solvent from the fresh solvent tank 120 is pumped into solvent bath 101A by pump 116E. In this manner, pump 111C helps maintain the level of solvent/oil slurry in solvent bath 101A.

As a result of the configuration in series of solvent baths 101B (stage 1) and 101A (stage 2) and the countercurrent flow of solvent, the solvent/oil slurry pumped into solvent bath 101A is cleaner than the solvent/oil slurry pumped into solvent bath 101B. The solvent/oil slurry in solvent bath 101B may contain a large concentration of dissolved oil and some fine cuttings. Larger cuttings are conveyed through solvent bath 101A. The majority of the oil, in some cases approximately 67%, may be removed from the cuttings by conveying the oil-contaminated drill cuttings through solvent bath 101B (stage 1). An additional amount of oil, in some cases approximately 33%, may be removed by conveying the oil-contaminated drill cuttings through solvent bath 101A (stage 2). The larger cuttings continue to convey across screen S101A and into the cuttings heating device 109.

A spray bar (not shown) may be used to spray the cuttings at the beginning of solvent bath 101A. The larger cuttings will convey across the screen S101A and into cuttings heating device 109. The larger cuttings may be fed into the cuttings heating device 109 by using an auger 113C. At this point, the majority (approximately 98% to 99%) of the oil will have been removed from the cuttings while traveling through the solvent baths 101B and 101A, across and through solvent screens S101B and S101A, (and 102B and 102B, through solvent screens S102B and 102A), and the cuttings are ready for the drying process in the cuttings heating device 109.

The solvent/oil slurry that has been collected from solvent bath 101B will pass through screen S101B and into drain D101B into circulating tank 117A and pumped by pump 116A to centrifuge 107. This solvent/oil slurry consists of fine drill cuttings and high concentrations of oil dissolved in the solvent. Therefore, in one embodiment, pump 116A may be a positive displacement pump. Centrifuge 107 separates the liquid oil/solvent phase of the slurry from the fine drill cuttings. The liquid oil/solvent phase separated by centrifuge 107 may be pumped by pump 116D through a filtering system 118. The fine solids separated by centrifuge 107 will be deposited through an auger into heating device 109. The oil/solvent fluid from the filtering system 118 is directed toward a distillation unit 119 to recover the used solvent for recycling through the process. The recycled solvent is directed toward fresh solvent tank 120, which is subsequently pumped into solvent baths 101A, 101B as set forth herein.

The combined larger cuttings from the bath system and the fine cuttings from the centrifugal system (comprising centrifuge 107) may be dried in heating device 109. Heating device 109 may comprise a dryer, or other such heating method as known in the industry. The cleaned cuttings may be subjected to temperatures sufficient to volatize the remaining solvent present on the wet cuttings. It should be noted that the cleaning process described herein, up until the heating zone, may be run at temperatures of about 40 to 90 degrees F. The dried cuttings from heating device 109 may contain very small amounts of oil residue. In one embodiment, the dried cuttings may contain less the 3% oil, less than 2% oil, or less than 1% oil. This reduction of residual oil will enable the dried cuttings to be disposed of in an environmentally acceptable manner. The cuttings may be returned to the environment or used as road base or fill material. In this manner, the cuttings can be recycled and should not have to be deposited into a landfill. Furthermore, oil, such as diesel oil, collected from the cuttings may be separated from the solvent and recycled for other uses.

As described above, the conveying of the cuttings on vibrating conveyors with removable screens through a series of baths, while flowing the solvent countercurrent to the direction of movement of the cuttings, insures that as the cuttings progress through the system, fresher solvent is being added at each step to efficiently clean the oil from the cuttings. In other words the solvent introduced in solvent bath 101A (and 102A) is fresher than the solvent introduced in solvent bath 101B (and 102B). The finer solids that flow through the centrifuge 107 are also cleaned more effectively by the use of the countercurrent flow of fresh solvent.

Figure 2:
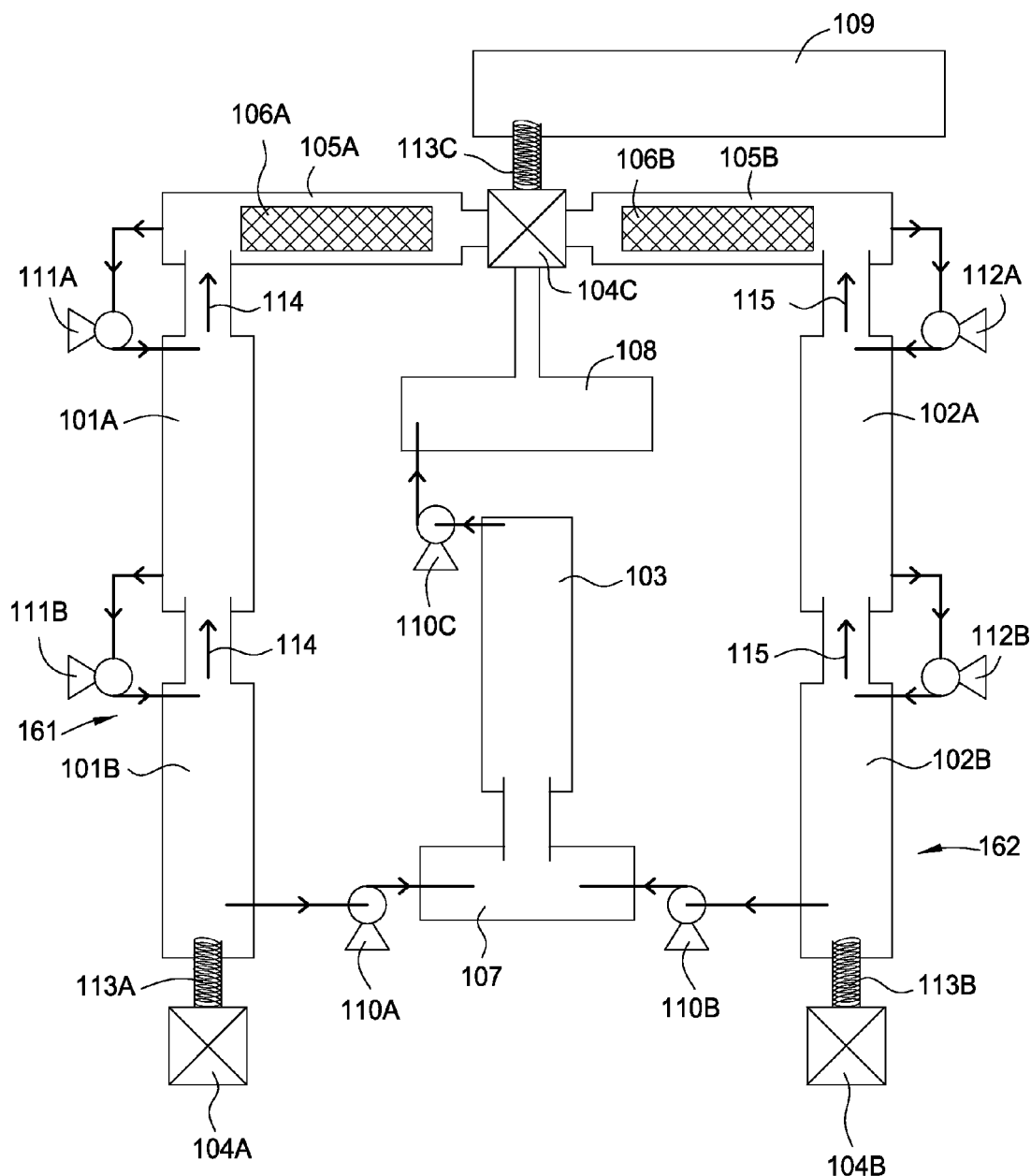
FIG. 2 is a schematic view of a two-stage apparatus for recovering oil from wellbore cuttings having a solvent flow system connected to vibrating conveyors in series.

FIG. 2 is a schematic view of a two-stage apparatus 150 for recovering oil from wellbore cuttings having a solvent flow system connected to a two-stage vibrating conveyor in series. For convenience, the components in the apparatus 150 that are similar to the components in the apparatus 100 will be labeled with the same number indicator. The apparatus 150 shown in FIG. 2 includes a first solvent bath line 161 and a second solvent bath line 162 connected in parallel, wherein each line 161, 162 comprises two solvent baths connected in series. More specifically, the first solvent bath line 161 includes solvent bath 101B (stage 1) in series with solvent bath 101A (stage 2), and the second solvent bath line 162 includes solvent bath 102B (stage 1) in series with solvent bath 102A (stage 2). Each solvent bath 101A, 101B, 102A and 102B and a series of pumps 111A, 111B, 112A, 112B, 110A, 110B and 110C keep the solvent flowing in series in a direction countercurrent to the direction of movement of the oil-contaminated cuttings. While FIG. 2 shows the apparatus 150 comprising two lines of solvent baths, each line in parallel, other embodiments may comprise just one line, or more than two lines of solvent baths. The solvent in solvent baths 101A, 101B, 102A and 102B comes from fresh solvent introduced upstream (with respect to solvent flow), such as in solvent rinses 105A and 105B.

The oil-contaminated wellbore cuttings from hoppers 104A and 104B may be introduced into solvent baths 101B and 102B containing a solvent (which contains some amount of oil) for a first-stage wash. The solvent is pumped into solvent baths 101B and 102B from solvent baths 101A and 102A, respectively, by pumps 111B and 112B, respectively. In one embodiment, a constant volume of solvent is maintained in each solvent bath. The level of solvent covering the contaminated cuttings in solvent baths 101B and 102B can be adjusted by controlling the volume of fluid pumped through pumps 111B and 112B, respectively. The solvent pumped from solvent bath 101A into solvent bath 101B will contain a contaminated solvent and dissolved oil slurry from solvent bath 101A. Similarly, the solvent pumped from solvent bath 102A into solvent bath 102B will contain a contaminated solvent and dissolved oil slurry from solvent bath 102A. Solvent baths 101B and 102B comprise a vibrating conveying surface which may be set at a vibration frequency so that the oil-contaminated drill cuttings are agitated as they move in a direction opposite to the flow of solvent. The general direction of movement of the oil-contaminated cuttings through solvent baths 101A, 101B, 102A and 102B is shown in FIG. 2 by arrows 114 and 115, respectively.

For ease of description, flow along solvent baths 101A, 101B, and solvent rinse 105A will be described. However, a similar process would occur in the parallel line of solvent baths 102A, 102B and final solvent rinse 105B. As the oil-contaminated cuttings move through vibration along solvent bath 101B, the solvent slurry generally flows in an opposite direction. The agitation of the oil-contaminated cuttings by the vibrating conveyors, along with the countercurrent flow of solvent, facilitates removal of entrained oils from the cuttings. The contaminated solvent and dissolved oil slurry may be introduced at an end of solvent bath 101B opposite the end of solvent bath 101B at which the oil-contaminated cuttings are introduced. Pump 111B pumps the contaminated solvent and dissolved oil slurry from solvent bath 101A into solvent bath 101B.

Once the solvent/oil slurry travels through solvent bath 101B, it is pumped out of solvent bath 101B into centrifuge 107 by pump 110A near the end of solvent bath 101B at which the oil-contaminated cuttings are introduced. This helps control the level of solvent/oil slurry in solvent bath 101B. Once the partly cleaned oil-contaminated cuttings reach the end of solvent bath 101B, they are transported through solvent bath 101A using a similar vibrating conveying surface as in solvent bath 101B. Solvent bath 101A will contain a solvent/oil slurry which is less contaminated than the solvent/oil slurry in solvent bath 101B. A similar process occurs in solvent bath 101A, wherein the oil-contaminated cuttings move in a direction towards solvent rinse 105A countercurrent to the flow of solvent, while oil in the cuttings is dissolved in the solvent/oil slurry. Fresh solvent from solvent rinse 105A is pumped into solvent bath 101A by pump 111A. In this manner, pump 111A helps maintain the level of solvent/oil slurry in solvent bath 101A.

As a result of the configuration in series of solvent baths 101B (stage 1) and 101A (stage 2) and the countercurrent flow of solvent, the solvent/oil slurry pumped into solvent bath 101A is cleaner than solvent/oil slurry pumped into solvent bath 101B. The solvent/oil slurry in solvent bath 101B may contain a small concentration of dissolved oil and some fine cuttings. Larger cuttings are conveyed through solvent bath 101A. The majority of the oil, in some cases approximately 67%, may be removed from the cuttings by conveying the oil-contaminated drill cuttings through solvent bath 101B (stage 1). An additional amount of oil, in some cases approximately 33%, may be removed by conveying the oil-contaminated drill cuttings through solvent bath 101A (stage 2). The larger cuttings continue to convey and rinse with solvent in solvent rinse 105A.

In solvent rinse 105A, fresh solvent is sprayed across the face of the cleaned cuttings on sieve 106A. A spray bar (not shown) may be used to spray the cuttings in solvent rinse 105A with the fresh solvent. The solvent used in solvent rinse 105A will be collected and pumped into solvent bath 101A. The larger cuttings retained by sieve 106A will convey across a dewatering ramp through solvent rinse 105A into hopper 104C. In the apparatus 150 shown in FIG. 2, cuttings emerging from solvent rinse 105B which have undergone a cleaning process similar to that just described for cuttings in solvent rinse 105A may also be collected in hopper 104C. The contents of hopper 104C may then be fed into heating device 109 using an auger 113C. At this point, the majority (approximately 98% to 99%) of the oil will have been removed from the cuttings while traveling through the solvent baths 101B, 101A and the solvent rinse 105A (and 102B, 102A and 105B in the parallel flow of cuttings from hopper 104B), and the cuttings are ready for the drying process in the heating device 109.

The solvent/oil slurry that has been collected from solvent bath 101B may be pumped by pump 110A to a centrifuge 107. This solvent/oil slurry consists of fine drill cuttings and high concentrations of oil dissolved in the solvent. Therefore, pump 110A may be a positive displacement pump. Centrifuge 107 separates the liquid oil/solvent phase of the slurry from the fine drill cuttings. The liquid oil/solvent phase may be drained from centrifuge 107 into a settling tank (not shown). The fine solids separated by centrifuge 107 are then deposited into a central solvent bath 103. Fresh solvent is pumped into the central solvent bath 103 from a solvent supply tank (not shown) as may be contained in a tank farm. The fresh solvent dissolves any oil/solvent mixture that was not separated by centrifuge 107. A slurry of less contaminated oil/solvent slurry and fine drill cuttings is pumped through pump 110C to a second centrifuge 108. The oil/solvent fluid from centrifuge 108 may be pumped to a holding tank (not shown) and the fine drill cuttings may be conveyed to hopper 104C. The oil/solvent fluid may be pumped to a unit to recover the used solvent for recycling through the process.

The combined larger cuttings from the bath system and the fine cuttings from the centrifugal system (comprising centrifuges 107 and 108) dumped into hopper 104C may be dried in heating device 109. Heating device 109 may comprise a dryer, or other such heating method as known in the industry. The cleaned cuttings may be subjected to temperatures sufficient to volatize the remaining solvent present on the wet cuttings. The solvent, water, and any oil remaining on the drill solids will also be volatized. It should be noted that the cleaning process described herein, up until the heating zone, may be run at temperatures of about 50-90° F. The dried cuttings from heating device 109 may contain very small amounts of oil residue. In one embodiment, the dried cuttings may contain less than 3% oil, less than 2% oil, or less than 1% oil. This reduction of residual oil will enable the dried cuttings to be disposed of in an environmentally acceptable manner. Furthermore, oil, such as diesel oil, collected from the cuttings may be separated from the solvent and recycled for other uses.

As described above, the conveying of the cuttings on vibrating conveyors through the series of baths while flowing the solvent countercurrent to the direction of movement of the cuttings, insures that as the cuttings progress through the system, fresher solvent is being added at each step to efficiently clean the oil from the cuttings. In other words, the solvent introduced in solvent rinse 105A (and 105B) is fresher than solvent introduced in solvent bath 101A (and 102A), which is fresher than the solvent introduced in solvent bath 101B (and 102B). The finer solids that flow through centrifuges 107 and 108 are also cleaned more effectively by the use of the countercurrent flow of fresh solvent.

Figure 3:
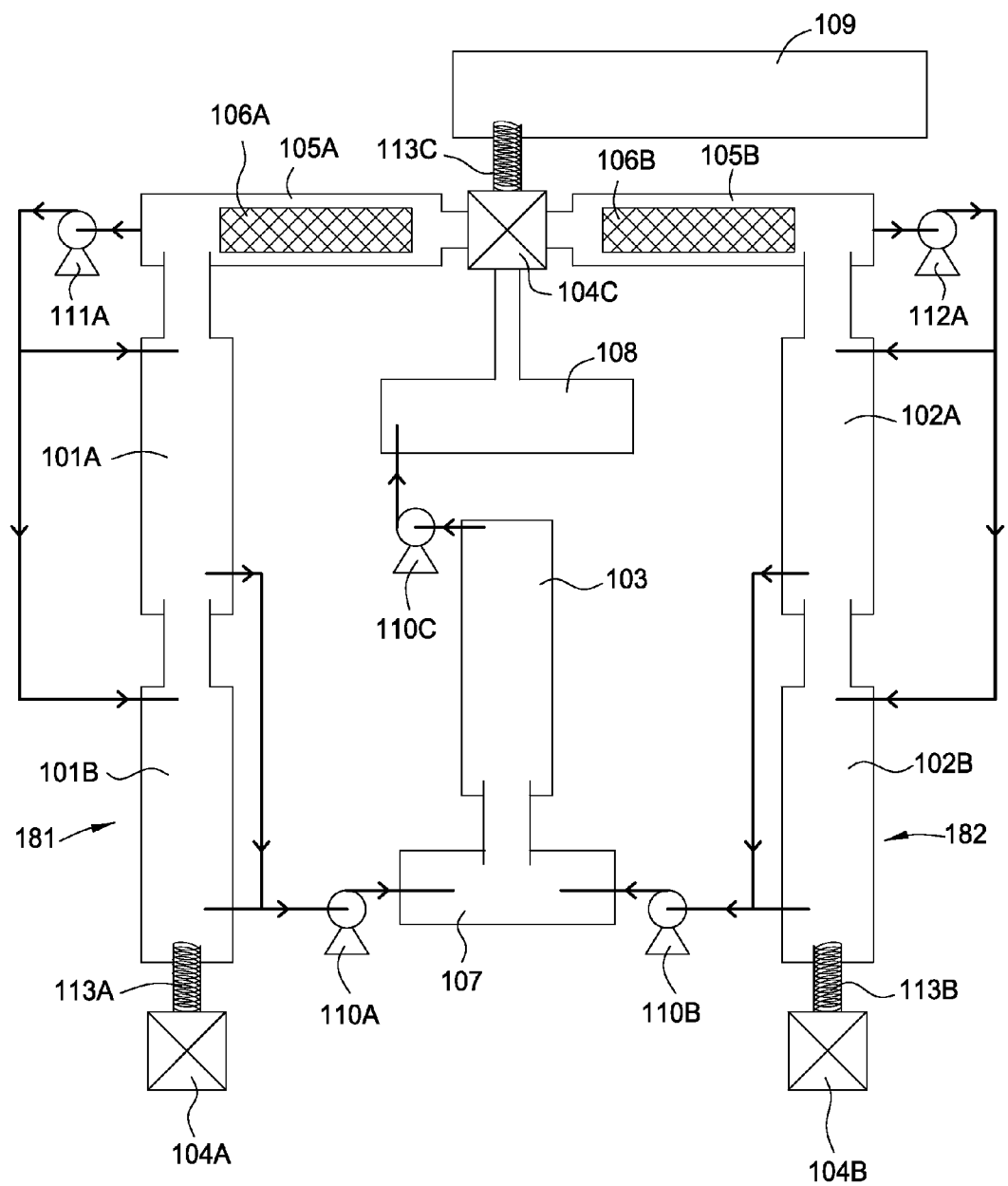
FIG. 3 is a schematic view of a two-stage apparatus for recovering oil from wellbore cuttings having a solvent flow system connected to vibrating conveyors in parallel.

FIG. 3 is a schematic view of a two-stage apparatus 175 for recovering oil from wellbore cuttings having a solvent flow system connected to vibrating conveyors in parallel. For convenience, the components in the apparatus 175 that are similar to the components in the apparatuses 100, 150 will be labeled with the same number indicator. The apparatus 175 includes a first solvent bath line 181 and a second solvent bath line 182. As shown in FIG. 3, solvent flow from the solvent rinse 105A may be pumped by pump 111A into solvents baths 101A and 101B in parallel such that the solvent entering solvent bath 101B is as clean as the solvent entering solvent bath 101A. In the apparatus 175, the solvent is pumped out of solvent baths 101A and 101B by pump 110A into centrifuge 107. In this manner, cuttings in solvent bath 101B may be cleaned more thoroughly in solvent bath 101B using a higher volume of solvent than in the apparatus 150 shown in FIG. 2. Similarly, as shown in FIG. 3, solvent flow from solvent rinse 105B may be pumped by pump 112A into solvents baths 102A and 102B such that the solvent entering solvent bath 102B is as clean as the solvent entering solvent bath 102A. The solvent may then be pumped out of solvent baths 102A and 102B by pump 110B into centrifuge 107. The dried cuttings from heating device 109 in this embodiment may contain very small amounts of oil residue. For instance, the dried cuttings may contain less than 3% oil, less than 2% oil, or less than 1% oil. This reduction of residual oil will enable the dried cuttings to be disposed of in an environmentally acceptable manner.

Figure 4:
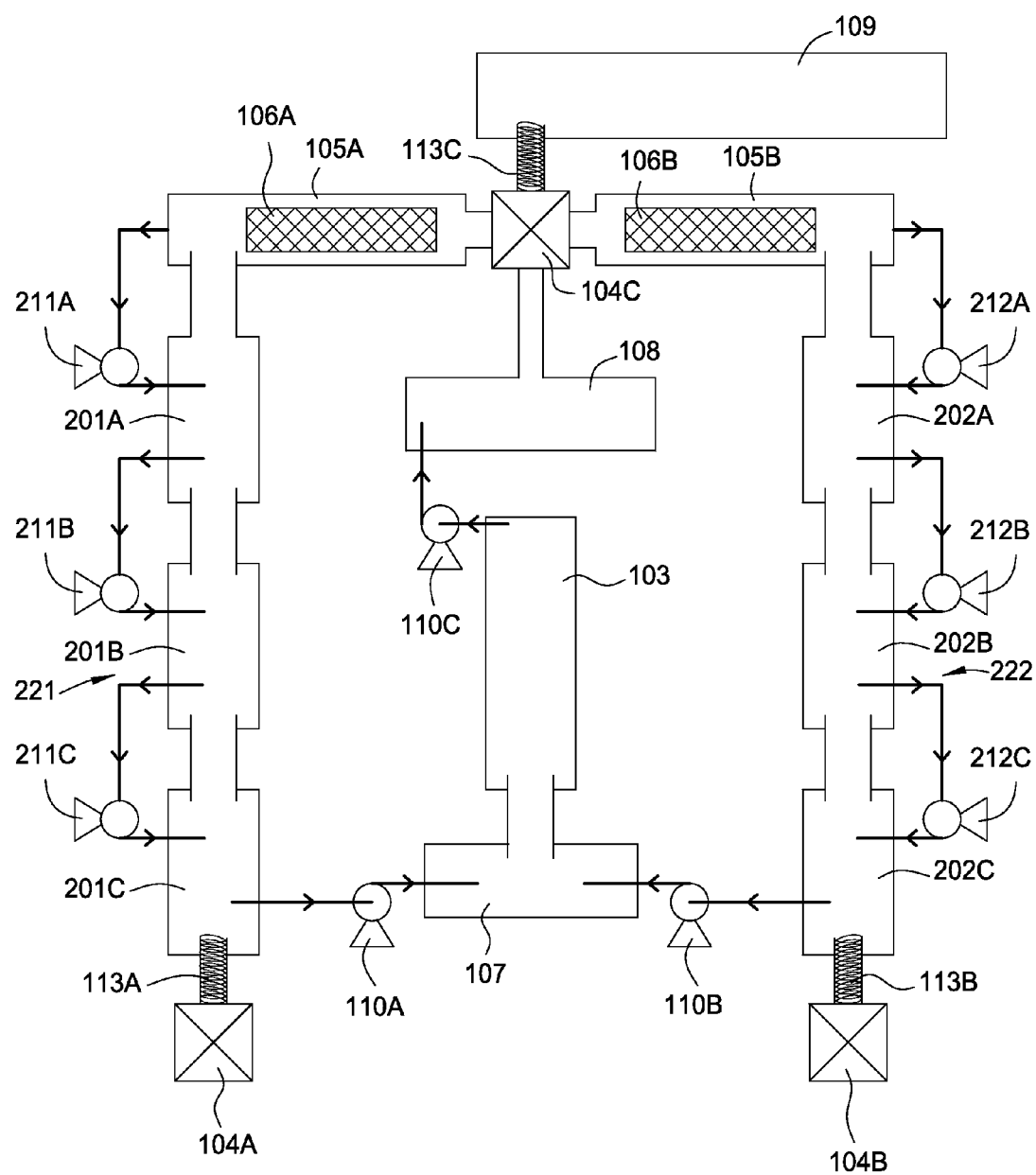
FIG. 4 is a schematic view of a three-stage apparatus for recovering oil from wellbore cuttings having a solvent flow system connected to vibrating conveyors in series.

FIG. 4 is a schematic view of a three-stage apparatus 200 for recovering oil from cuttings having a solvent flow system connected in series. For convenience, the components in the apparatus 200 that are similar to the components in the apparatuses 100, 150, 175 will be labeled with the same number indicator. The apparatus 200 includes a first solvent bath line 221 and a second solvent bath line 222 connected in parallel, wherein each line 221, 222 comprises solvent baths connected in series. More specifically, the first solvent bath line 221 includes solvent bath 201C (stage 1) in series with solvent bath 201B (stage 2) and solvent bath 201A (stage 3). The second solvent bath line 222 includes solvent bath 202C (stage 1) in series with solvent bath 202B (stage 2) and solvent bath 202A (stage 3).

The first solvent bath line 221 and the second solvent bath line 222 clean oil-contaminated cuttings received from hoppers 104A and 104B. Pumps 211A, 211B, and 211C pump the solvent from solvent wash 205A to solvent bath 201A, from solvent bath 201A to solvent bath 201B, and from solvent bath 201B to solvent bath 201C, respectively. Similarly, pumps 212A, 212B, and 212C pump the solvent from solvent wash 205B to solvent bath 202A, from solvent bath 202A to solvent bath 202B, and from solvent bath 202B to solvent bath 202C, respectively. In this embodiment, a higher degree of cleaning of the oil-contaminated cuttings may be achieved. Although the solvent flow system in FIG. 4 is shown in series configuration, the flow system may also be configured in parallel, similar to the apparatus shown in FIG. 3. In a parallel configuration, cleaner solvent from solvent rinses 105A and 105B may be introduced at each of the three stages so that a higher amount of oil may be removed from the cuttings, using a higher volume of solvent. The dried cuttings from heating device 109 in this embodiment may contain very small amounts of oil residue. For instance, the dried cuttings may contain less than 3% oil, less than 2% oil, or less than 1% oil. This reduction of residual oil will enable the dried cuttings to be disposed of in an environmentally acceptable manner.

It should be noted that, while efficiently cleaning the solids through the process, the solvent-to-cuttings ratio must be sufficient for the oil to be dissolved into the solvent. The amount of solvent must be high enough to absorb the large amounts of oil to be recycled from the drill cuttings. This ratio will be adjusted as different types of oil-based cuttings are cleaned. This process will clean both diesel oil and synthetic based oil-contaminated cuttings. The solvent may have the capacity to dissolve any residue present as the cuttings convey through each bath and centrifuge stage.

In one embodiment, each apparatus 100, 150, 175, 200 can be constructed as a modular unit which has several independent modules. For example, the modular unit for apparatus 100 may include a first module comprising the first solvent bath line 121, a second module comprising the second solvent bath line 122, a third module comprising circulating tanks 117A, 117B, heating device 109 and centrifuge 107, and a fourth module comprising distillation unit 119 and solvent tank 120. The components on each module may be attached to a separate skid base. The skid base for the first, second, third and fourth module could be individually transported to a worksite and assembled together to form the modular unit for apparatus 100. The use of modules to form the modular unit for apparatus 100 allows for easy setup, breakdown and transport. In another embodiment, all the components in the modular unit for apparatus 100 may be mounted on a single skid base that could be transported to a first worksite to remove and recover oil from wellbore cuttings at the first worksite. After cleaning the cuttings at the first worksite, the single skid could be transported to a second worksite to remove and recover oil from wellbore cuttings at the second worksite. The process of transporting the single skid and cleaning cuttings at different worksites could be done any number of times.

While the foregoing is directed to embodiments of the present invention, other and further embodiments of the invention may be devised without departing from the basic scope thereof, and the scope thereof is determined by the claims that follow.

The invention claimed is:

1. A method for separating solvent-soluble contaminant from wellbore cuttings, the method comprising:
   moving and agitating contaminated wellbore cuttings on a first vibrating conveyor in a first direction;
   flowing solvent through the first vibrating conveyor in a second direction countercurrent to the first direction;
   moving and agitating contaminated wellbore cuttings on a second vibrating conveyor in a third direction; and
   flowing the solvent through the second vibrating conveyor in a fourth direction countercurrent to the third direction.

2. The method of claim 1, wherein the solvent is hexane.

3. The method of claim 1, wherein the solvent flows through the first and second vibrating conveyors in parallel.

4. The method of claim 1, wherein the solvent flows through the first and second vibrating conveyors in series.

5. The method of claim 1, wherein the wellbore cuttings exiting the first vibrating conveyor are placed on the second vibrating conveyor.

6. The method of claim 1, further comprising supplying the solvent to the second vibrating conveyor from a solvent storage tank.

7. The method of claim 6, further comprising pumping the solvent used in the second vibrating conveyor to the first vibrating conveyor.

8. The method of claim 1, further comprising filtering the wellbore cuttings through a screen on the first vibrating conveyor before moving the wellbore cuttings to the second vibrating conveyor.

9. The method of claim 1, further comprising filtering the wellbore cuttings through a screen on the second vibrating conveyor before moving the wellbore cuttings to a heating device.

10. The method of claim 1, further comprising drying the wellbore cuttings exiting the second vibrating conveyor in a heating device.

11. The method of claim 1, further comprising pumping used solvent from the first vibrating conveyor to a distillation member.

* * * * *